(12) United States Patent
Bernstein et al.

(10) Patent No.: US 11,886,431 B2
(45) Date of Patent: Jan. 30, 2024

(54) REAL-TIME ANALYTICAL QUERIES OF A DOCUMENT STORE

(71) Applicant: Hyland UK Operations Limited, Maidenhead (GB)

(72) Inventors: Joel Bernstein, New York, NY (US); Michael Suzuki, Sunbury-on-Thames (GB); John Newton, Warfield (GB)

(73) Assignee: Hyland UK Operations Limited, Maidenhead (GB)

( * ) Notice: Subject to any disclaimer, the term of this patent is extended or adjusted under 35 U.S.C. 154(b) by 167 days.

(21) Appl. No.: 16/418,185

(22) Filed: May 21, 2019

(65) Prior Publication Data

US 2019/0361897 A1    Nov. 28, 2019

Related U.S. Application Data

(60) Provisional application No. 62/675,097, filed on May 22, 2018.

(51) Int. Cl.
| | |
|---|---|
| G06F 16/2452 | (2019.01) |
| G06F 16/2455 | (2019.01) |
| G06F 16/25 | (2019.01) |
| G06F 16/242 | (2019.01) |
| H04L 9/40 | (2022.01) |

(Continued)

(52) U.S. Cl.
CPC .... G06F 16/24524 (2019.01); G06F 16/2228 (2019.01); G06F 16/244 (2019.01); G06F 16/2455 (2019.01); G06F 16/252 (2019.01); H04L 63/101 (2013.01); H04L 63/102 (2013.01); G06N 20/00 (2019.01)

(58) Field of Classification Search
CPC .......... G06F 16/24524; G06F 16/2228; G06F 16/2455; G06F 16/244; G06F 16/252; G06F 21/6218; G06F 2221/2141; G06F 21/6227; H04L 63/101; H04L 63/102; G06N 20/00
See application file for complete search history.

(56) References Cited

U.S. PATENT DOCUMENTS 5,864,843 A * 1/1999 Carino, Jr. ............ G06F 16/289
707/999.102
8,918,388 B1    12/2014 Chen
(Continued)

*Primary Examiner* — Hosain T Alam
*Assistant Examiner* — Chongsuh Park
(74) *Attorney, Agent, or Firm* — Mintz, Levin, Cohn, Ferris, Glovsky and Popeo, P.C.; F. Jason Far-hadian, Esq.

(57) ABSTRACT

A method for real-time analytical queries of a documents store is provided. The method includes receiving a query and an access control list associated with a user, the query requesting content managed by a content management system. The method further includes generating an execution plan based on the query and the access control list. The method further includes constraining, based on the execution plan, possible results returned from the query using a content index of a plurality of content items maintained in a repository of the content management system. The constraining includes limiting the at least one processor from adding a content item of the plurality of content items to a permissions-filtered results set based on the access control list identifying the user as not having permission to access the content item. The method further includes aggregating the permissions-filtered results set and returning the aggregated permissions-filtered results set.

20 Claims, 4 Drawing Sheets

(51) Int. Cl.
    *G06F 16/22*     (2019.01)
    *G06N 20/00*     (2019.01)

(56)         References Cited

U.S. PATENT DOCUMENTS

| | | |
|---|---|---|
| 2009/0178144 A1 | 7/2009 | Redlich et al. |
| 2010/0250497 A1 | 9/2010 | Redlich et al. |
| 2011/0106853 A1 | 5/2011 | Baker et al. |
| 2011/0246439 A1* | 10/2011 | Isard ............... G06F 16/951 707/723 |
| 2011/0302194 A1* | 12/2011 | Gonzalez ............ G06F 16/29 707/769 |
| 2012/0089339 A1 | 4/2012 | Ganeshalingam et al. |
| 2013/0097430 A1* | 4/2013 | Mittelstadt ........... G06F 16/245 713/189 |
| 2013/0339311 A1* | 12/2013 | Ferrari ............. G06Q 30/0627 707/769 |
| 2014/0280159 A1* | 9/2014 | Cao ................. G06F 16/2456 707/737 |
| 2014/0344345 A1 | 11/2014 | Venkatraman et al. |
| 2015/0082399 A1 | 3/2015 | Wu et al. |
| 2015/0193636 A1 | 7/2015 | Snelling |
| 2016/0104002 A1 | 4/2016 | Schneider et al. |
| 2016/0125015 A1 | 5/2016 | Zwilling et al. |
| 2016/0125189 A1 | 5/2016 | Antonopoulos et al. |
| 2016/0210326 A1* | 7/2016 | Tolman ............. G06F 16/2423 |
| 2017/0344749 A1* | 11/2017 | Yang ................ G06F 21/6209 |
| 2017/0371954 A1* | 12/2017 | Kikuchi ............. G06F 16/3322 |
| 2018/0218160 A1 | 8/2018 | Wetherall et al. |
| 2018/0247072 A1* | 8/2018 | Hind .................. H04L 63/101 |
| 2019/0095488 A1* | 3/2019 | Bhattacharjee ....... G06F 16/951 |

* cited by examiner

REAL-TIME ANALYTICAL QUERIES OF A DOCUMENT STORE

CROSS REFERENCE TO RELATED APPLICATION

The present application claims priority to U.S. Patent Application No. 62/675,097, filed May 22, 2018, entitled REAL-TIME ANALYTICAL QUERIES OF A DOCUMENT STOR, the disclosure of which are incorporated herein by reference in their entirety.

TECHNICAL FIELD

The subject matter described herein relates generally to content management systems and to obtaining multi-dimensional reports and analytics based on real-time analytical queries.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein in some examples as "files" or "documents") that an enterprise produces or generates, retains or otherwise stores, manipulates or modifies, etc. can support the requirements of one or more of such applications, and optionally other requirements, to provide a coherent solution in which content processes, management processes, and the like are capable of accessing content across a variety of applications subject to access controls, permissions, and/or the like. Content managed by a CMS can include one or more of documents, images, photos, Web pages, records, XML documents, other unstructured or semi-structured files, etc. Content retained in a CMS can also include directory structures such as folders, file trees, file plans, or the like, which can provide organization for multiple content items in addition to storing or otherwise representing relationships between content item, etc. An "enterprise" can generally refer to an organization, such as for example a business or company, a foundation, a university, or the like, and can have content requirements related to one or more business processes, content uses, etc.

A CMS manages the actual digital binary content, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can also manage one or more workflows for capturing, storing, and distributing content, as well as the lifecycle for how long content will be retained and what happens after that retention period.

A CMS for use in enterprise content management can include one or more of document management tools, applications, and interfaces to support general office work, search, and discovery. Workflow management capabilities of a CMS can support numerous business processes, optionally including case management and review and approval.

SUMMARY

As discussed in greater detail below, features of the current subject matter can enable analytical queries on a document store that preserves access control to the document store and provides secure access to only the set of documents that a user has access to. Features of the current subject matter may support real-time processing of analytical queries of a document store of a CMS.

In one aspect, a method for real-time analytical queries of a documents store is provided. The method includes receiving a query and an access control list associated with a user, the query requesting content managed by a content management system. The method further includes generating an execution plan based on the query and the access control list. The method further includes constraining, based on the execution plan, possible results returned from the query using a content index of a plurality of content items maintained in a repository of the content management system. The constraining includes limiting the at least one processor from adding a content item of the plurality of content items to a permissions-filtered results set based on the access control list identifying the user as not having permission to access the content item. The method further includes aggregating the permissions-filtered results set. The method further includes returning the aggregated permissions-filtered results set based on the execution plan.

Implementations of the current subject matter can include methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Shown are various flowcharts, diagrams and information demonstrating the method and systems. When practical, similar reference numbers denote similar structures, features, or elements.

DETAILED DESCRIPTION

Figure 1:
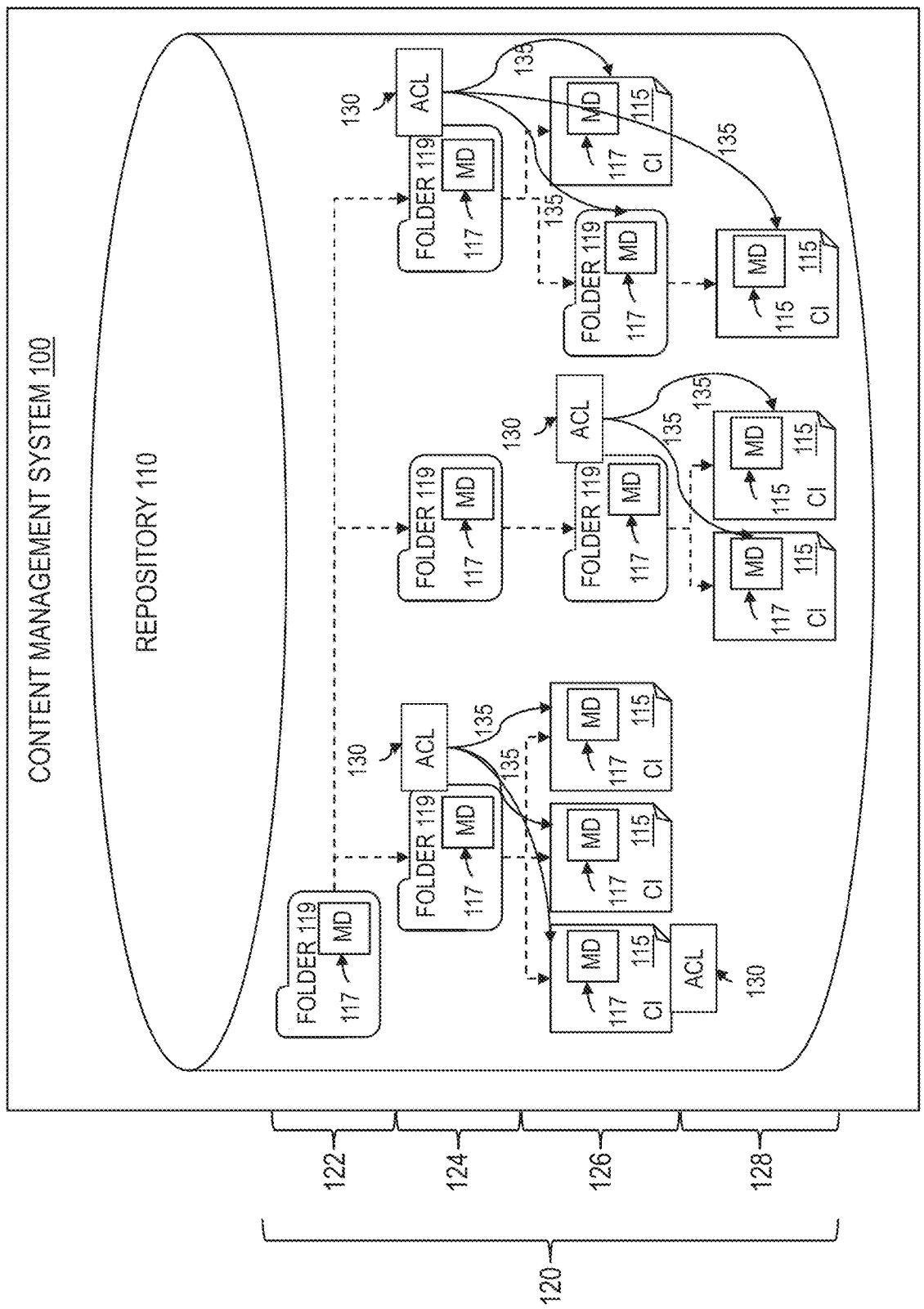
FIG. 1 shows a diagram illustrating features of a content management system consistent with implementations of the current subject matter.

Modern content management systems commonly include functionality that allows a user to perform searches for documents or folders stored within or otherwise managed by the CMS. Such search functionality can include a text entry box into which a user can enter one or more search terms to trigger retrieval of documents or folders. Any user interface suitable for search of content in a CMS and for conveying information about the retrieved content can be consistent with the implementations of the current subject matter described herein provided such a user interface supports one or more of the described features and functionality.

As noted above, an important function of a CMS, particularly one used for storing and managing content related to an enterprise environment, can be proper handling of user permissions for accessing, viewing, reading, writing, modifying, etc. content stored in and/or managed by the CMS. One approach for handling user permissions or other access controls for documents in a CMS can include use of access control lists (ACLs). An ACL can be considered as an ordered list of access control entries (ACEs), each of which associates a single authority to a single permission group or permission, and states whether the permission is to be allowed or denied. Nodes (e.g. nodes on a directory hierarchy such as a folder, sub-folder, document, etc.) in a CMS can include an associated ACL. In general an ACL specifies if it should inherit ACEs from an ACL associated with a parent node. An ACE generally includes an authority, a permission, and a deny/allow flag. While the examples described herein make general reference to ACLs, other approaches to handing of user permissions relative to content items in a CMS are also within the scope of the current subject matter. A non-limiting example of the use of ACLs is described in co-pending and co-owned U.S. patent application Ser. No. 15/442,561, the disclosure of which is incorporated herein by reference.

Additionally, an important aspect of the CMS, may be providing analysis and insights of data content stored in and/or managed by the CMS. Traditionally, running analytics on content management systems involves an extract, transform, and load (ETL) process. The ETL process may include extracting data and/or metadata from a data source to a traditional analytics engine, transforming the data and/or metadata for storing in the proper format or structure for the purposes of querying and analysis in the analytics engine, and then loading the resulting analytics into a final target database. Such traditional ETL processes may lose access controls and/or security measures on the data. Further, ETL processes may be resource and time intensive and may not reflect recent changes to the CMS and/or content within the CMS.

This document describes a system and method for processing analytical queries on a CMS document store that preserves access control to the document store and provides secure access to a set of documents in accordance with user permissions. In exemplary implementations, the system and method are configured for real-time parsing a received query based on an applied ACL, aggregating search results sets, and returning a filtered result set based on the ACL to a client.

FIG. 1 shows a diagram illustrating components of a CMS 100 illustrating how various features discussed herein, such as for example ACLs, ACEs, content items, folders, and the like, may interact or operate consistent with implementations of the current subject matter. A CMS installation 100 manages a repository 110. The CMS 100 can be implemented as software or other code running on one or more computing systems each of which includes one or more programmable processors. The repository 110 includes physical storage for the content items (e.g. optical, magnetic, solid state, or other storage devices), which can optionally be part of one or more computing system implementing the CMS. Alternatively, the repository and the content stored therein can be managed by a CMS implemented on one or more computing systems that are remote from one or more computing systems that include the physical storage upon which the content items are stored.

The repository 110 stores content, including content items 115, which can also include associated metadata 117 as well as the content itself. The content items 115 can be organized according to a file structure hierarchy 120, which can optionally be a folder tree having one or more folders 119 or other structures defining one or more levels of file structure hierarchy as illustrated in FIG. 1. Folders 119 or other structures defining levels of a hierarchy are also considered as content items (as noted above), and therefore also include associated metadata 117. In the example illustrated in FIG. 1, the file structure hierarchy 120 includes four levels: a top level 122, and lower levels 124, 126, and 128. One or more of the levels 122, 124, 126, 128 of the hierarchy can have a reference to an associated ACLs (also referred to as an ACL reference 130). Alternatively, ACLs or other permissions can be handled via relational database entries, for example with each ACL or other designator of user permissions for access to content items, folders, etc. having database records associated with it for each content item, folder, etc. that is associated with that ACL or other permission designator. One or more individual content items can also be associated with one or more ACLs (which henceforth in this disclosure are summarized merely as ACLS). In general, an ACL associated with a folder can propagate to any sub-folders within the folder as well as any content items in the folder or in the sub-folders. For example, the ACL associated with a folder 119 can be also associated with content items 117 or other folders 119 at a lower hierarchy level that are contained within in that folder. This association can be represented by an ACL link 135, which can be explicit or implicit. These ACLs 130, or alternatively other definitions of access permissions (which are also consistent with the current subject matter) include restrictions imposed on a level of access granted to a given user with regards to the user interacting with a given content item (or items) managed by the CMS 100.

The level of access can include one or more of full access, read only, no access, discoverable only, or other possible options. Full access generally imposes no restrictions on the ability of the user to perform actions such as read, view, edit, delete, copy, download, etc. on the content item. Access controls can optionally restrict one or more of these permissions for a user relative to the content item. A full restriction would be no access—the user is not allowed to even see that the content item exists. For example, the content item may be hidden from appearing in search results despite matching query criteria or search terms, etc. or may be invisible when a user navigates to a folder or other file structure including such a content item for which the user lacks the necessary access. "Discoverable only" can mean that the content item may appear as a result of a search or within a folder that a user navigates to, but the user would not be able to open, download, or perform any other actions on the content item. In some examples, a discoverable only file can appear in the user interface as greyed out or otherwise non-selectable. Such a designation can refer to content items or file hierarchy structures that a user is able to find by searching on metadata or the like, but whose content the user is not allowed to access. In an example, a user viewing a set of search results or browsing to a folder or other organizational structure that includes a content item for which the user does not have the appropriate restriction mark or marks but which has a "discoverable only" setting, the presence of the content item may not be hidden from the user, but no other actions can be taken by the user on the content item.

When a user initiates a search on the CMS, the results displayed to the user (e.g., via a user interface view) desirably include only those content items that a) match any search terms or other criteria provided by the user and b) are accessible to the user. Accessible to the user means that the user is at least capable of discovering a content item based on the user's level of access or user permission (e.g., as designated in an ACL). If the user specifies, or if other settings of the CMS so indicates, the results displayed may desirably be limited to only those content items for which the user has a more permissive level of access than merely discoverable only. If the user's level of access to a content item is no access (or some other level of access that prevents the user from even discovering (or otherwise being made aware) of a content item, that content item may not appear in a results set generated in response to a search, query, or file structure navigation request by the user that would otherwise have resulted in display of the content item as a search or query result or as being contained within a folder or other file structure that the user has reached.

Figure 2:
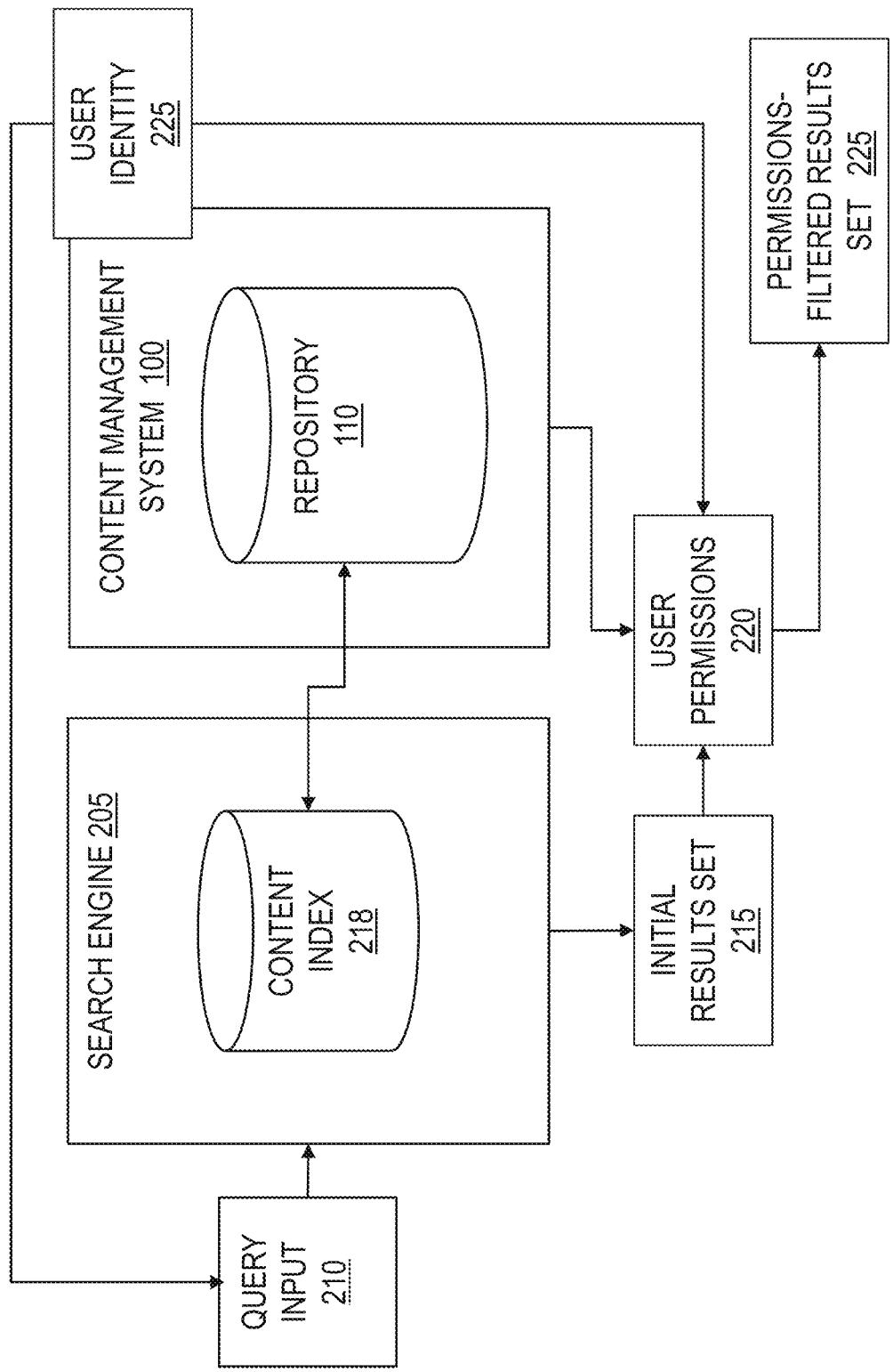
FIG. 2 shows a diagram illustrating application of user permissions after generation of an initial results set, consistent with implementations of the current subject matter.

A typical database search engine generally accesses all results meeting the query parameters and then performs a post-retrieval evaluation of the results before providing those results to the query originator. One example of a search engine typically employed in enterprise content management systems is the Solr search platform available from the Apache Software Foundation (Forest Hill, MD). In conventional approaches, for example as illustrated in FIG. 2, a search engine 205 may evaluate the search terms and/or other criteria provided by a user (e.g. a query input 210) to determine an initial results set 215. The determining of the initial results set 215 generally includes a query against one or more content indexes 218 of the CMS repository 110 to identify those content items having indexed content and/or metadata that matches the query input 210. The initial results set 215 can then be limited by the CMS 100 or other front end application by evaluating and applying user permissions 220 relative to a user identity 225 to eliminate those content items included in the initial results set but not accessible to the user to thereby produce a permissions-filtered result set 230. Evaluation of user permissions can include evaluating whether to allow or deny access to a content item; whether a user has necessary ownership rights of the content item (e.g. as may be implemented in a records management environment, etc.), whether any security restrictions or classifications, caveats, supplementary markings, etc. are applicable that may prevent user access to the content item; or the like. Caveats can generally refer to a designation applied to a content item or other file structure or to a user to indicate some type of security-based (or other) of restriction on possible user access to that content item or file hierarchy structure on top of more traditional security or clearance markings. A non-limiting example of the use of caveats is described in co-pending and co-owned U.S. patent application Ser. No. 15/423,521, the disclosure of which is incorporated herein by reference.

In some implementations of the current subject matter, a search engine 205 associated with a CMS 100 can include features relating to strategic evaluation of permissions of the query originator (e.g. a human user entering query terms into a search box or other user interface element, an application from within which a query is generated under direction from a logged-in user, or the like) making a query request within the search engine 205. This approach can enable generation of permissions-filtered result set 230 that is already limited to only those results that are actually available to the query originator (e.g. the user) directly within the search engine 205 rather than requiring any post processing by the CMS 100 or other front-end application.

Figure 3:
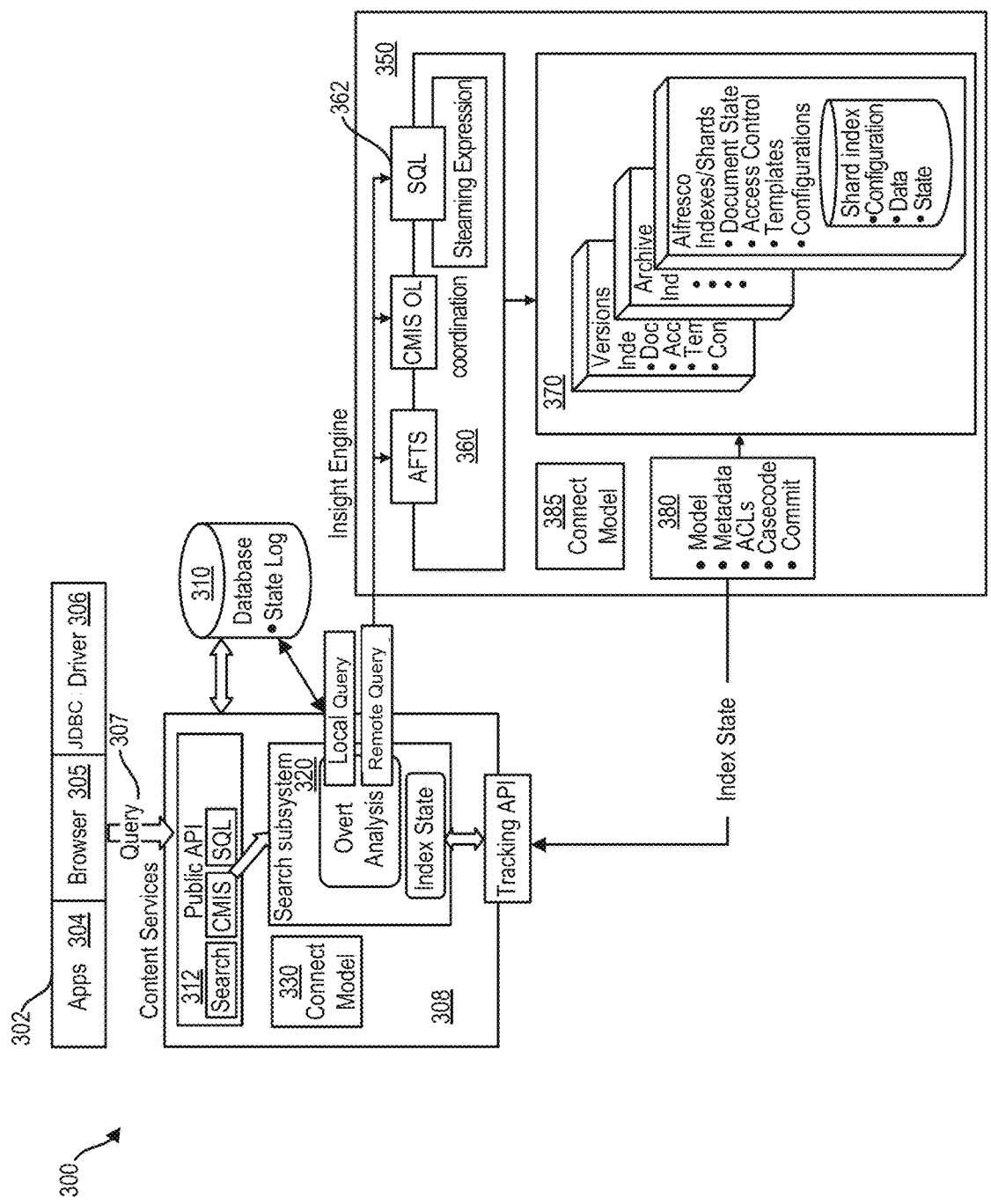
FIG. 3 shows a diagram illustrating features of a system consistent with implementations of the current subject matter.

FIG. 3 is an illustration of a system 300 having features consistent with implementations of the current subject matter. The system 300 includes a client 302, a CMS 308, and an insight engine 350. As shown in the example of FIG. 3, the client 302 may include an application 304, a browser 305, and a Java Database Connectivity (JDBC) driver 306 for communicating with the CMS 308. In some aspects, the client 302 may communicate with the CMS 308 over a JDBC connection using the JDBC driver 306. The JDBC connection may be established with a username and a password authentication credentials. The JDBC driver 306 may create a JDBC Statement and send a SQL query 307 to the CMS 308 along with the credentials. The credentials may be sent using http basic authentication. In some aspects, secure sockets layer (SSL) may be used to encrypt the request and basic authentication credentials.

The CMS 308 may receive the query 307 and perform authentication and/or authorization using the authentication credentials received. The CMS 308 may include a CMS repository 310, a public API 312, a search engine 320, and a content model 330. While the CMS repository 310 is shown external to the CMS 308, it may also be located internally on the CMS 308. After receiving the query 307 and performing authentication, the CMS 308 may then assign ACLs to the query 307.

After assigning the ACLs, the CMS 308 and/or search engine 320 may then send the ACLs and the query 307 to the insight engine 350 or the search engine 320. Transmitting the ACLs along with the query may preserve access control and/or security associated with the documents during query analysis. As shown in FIG. 3, the insight engine 350 includes a coordination component 360, an execution engine 370, a tracker component 380, and a content model 385. The coordination component includes an SQL parser and planner 362. The SQL parser and planner 362 may maintain a virtual database schema used by the SQL parser and planner 362 to create an execution plan for processing the query 307. The execution engine 370 may be configured to perform analysis on the query 307 based on the execution plan.

The virtual schema may include fields that are present in a search index and/or database as well as virtual fields used to specify different behaviors in generating an SQL execution plan. A virtual field may be defined as a database field whose value is automatically calculated using other existing field values, or another deterministic expression. In some aspects, the virtual field may not store data in physical storage but rather points to physical data of a field and/or to metadata of a logical wrapper. The virtual field may also be queried to retrieve the metadata information from a database that may not typically be assessable to a user. For example, the virtual field may be able to retrieve operational data, such as creation timestamps, deletion timestamps, lock timestamps, time series data, and/or other data. In some aspects, the query results with this metadata may be returned to the user. The use of virtual fields to indicate behavior in generating the SQL execution plan may allow the insight engine 350 and/or the SQL parser and planner 362 to create SQL queries that are easier to write and allow for a wider range of requests and responses than a typical search query.

In a non-limiting example, a virtual time field may added to the insight engine 350 virtual schema for every "datetime" field in the virtual schema. In some aspects, the virtual schema may include a "created" field, which stores a create datetime for a document. The presence of the created field may add three virtual time fields to the virtual schema. For example, the virtual time fields may include a created_day field, a created_month field, a created_year field. These virtual fields may not exist in an actual search index of the insight engine 350, and may only appear in the virtual schema. Virtual time fields may also be used in SQL aggregation queries. A sample query is: select count(*), created_day. The created_day field may be displayed in the following format: YYYY-MM-DD. The virtual time field may be designed to eliminate the need for users to specify complex SQL functions to specify time series queries that aggregate over datetime fields. The virtual time fields may also appear in the result set formatted for display.

In some aspects, the insight engine 350 and/or the SQL parser and planner 362 may use virtual fields as part of a custom SQL syntax to specify machine-learning and natural language processing operations. For example, a query may include: select_key_phrases_from CMS 308 where cm_description='oil' and _field_='cm_content' limit 10. The example above extracts the key phrases from the cm_content field for documents where the cm_description field matches the term 'oil'. As shown above, two virtual fields in the SQL query trigger the use of a specific machine learning algorithm: _key_phrases_ and _field_. These virtual fields may not exist in the actual schema and may be used to specify a machine learning operation. For example, when the_key_phrases_virtual field is used in a SQL select statement, the insight engine 350 may analyze a top N documents from the result set and create term vectors containing bigram phrases. The term vectors may be created from text stored in a field specified by the _field_predicate (e.g., cm_content). The term vectors may then be clustered using k-means clustering, or another method of vector quantization, and a highest scoring bigrams phrases may be extracted from centroid clusters. The insight engine 350 may calculate a SQL result set that may contain the extracted bigram phrases in the _key_phrases_field.

In response to receiving the query 307 and ACLs from the CMS 308, the SQL parser and planner 362 may create an execution plan for processing the query 307. As noted above, the SQL parser and planner 362 may utilize virtual fields and/or virtual time series data in creating the execution plan. The execution plan may be implemented as a request from the SQL parser and planner 362 that is received and understood by the execution engine 370.

In some aspects, the execution plan may include two stages. In a first stage, the execution engine 370 performs a search using a distributed search index with the ACLs applied. For example, upon receipt of the query 307, the execution engine 370 may search a search index and return a result set of documents based on the query 307. The search index may include an inverted search index. Additionally, the execution engine 370 may perform evaluation of user permissions as part of directly producing a permissions-filtered result set without the need for post-query processing of permissions evaluated by the CMS 308 or some other front end application.

For example, the execution engine 370 may apply the ACLs received from the CMS 308 to filter the result set based on permissions (e.g., ACLs) associated with the user initiating the query 307. To accomplish this outcome, the execution engine 370 may employ a user permissions index that correlates, or otherwise associates, user permissions with those content items maintained in the CMS repository 310 or managed by the CMS 308 to which the user permissions are applicable. The user permissions index may provide significantly quicker and more dynamic search results. The user permissions index may be included in the evaluation of the query 307 by the execution engine 370 such that the execution engine 370 evaluates the user permissions index against a user identity to filter on those content items that the user could feasibly be allowed to see in a permissions-filtered results set in addition to evaluating the query input 307 provided by the client 302.

The evaluation of the user permissions index against the user identity can optionally involve searching an ACL index for those ACLs designating the user identity as "access allowed" at a sufficient level of access to permit the user to at least discover, or optionally at least interact with (e.g. by opening, viewing, moving, editing, deleting, downloading, etc.) those content items assigned to such ACLs. The content index or indexes used by the execution engine 370 for evaluating the query 307, such as for example a content index, a metadata index, etc., can then be filtered (e.g. a search on the content index can be constrained) to only those entries relating to content items that appear on the ACLs identified in the search of the ACL index. It will be understood that other implementations of user permission indexes (e.g., besides an ACL index as described above) are also consistent with features of the current subject matter.

In another example implementation, the query 307 may be evaluated first by the execution engine 370 before searching the user permissions index. Alternatively, the evaluations of the query 307 against the one or more content indexes may optionally occur effectively concurrently with the evaluation of the user permissions index against the user identity. The results of the these two evaluations may be combined by operation of the execution engine 370 to directly produce the permissions filtered results set without a need for any post execution engine 370 processing of an initial results set by the CMS 308 or some other front end application. As such, the first stage may return a filtered result set of documents that the user is authorized to view.

In a second stage, SQL aggregations may be gathered based on the filtered result set of the first stage. The execution engine 370 may search a column store database to perform the SQL aggregations. The SQL aggregations on the filtered result set may be returned to the CMS 308 and then back to the client 302 (e.g., via the JDBC driver 306).

The tracker component 380 may be configured to monitor the content model 385, content, metadata, ACLs, and/or the like. The tracker component 380 and/or the insight engine 350 may transmit the monitored data back to the CMS 308 to modify the content model 330, 385, the search engine 320, the CMS repository, and/or the like.

Figure 4:
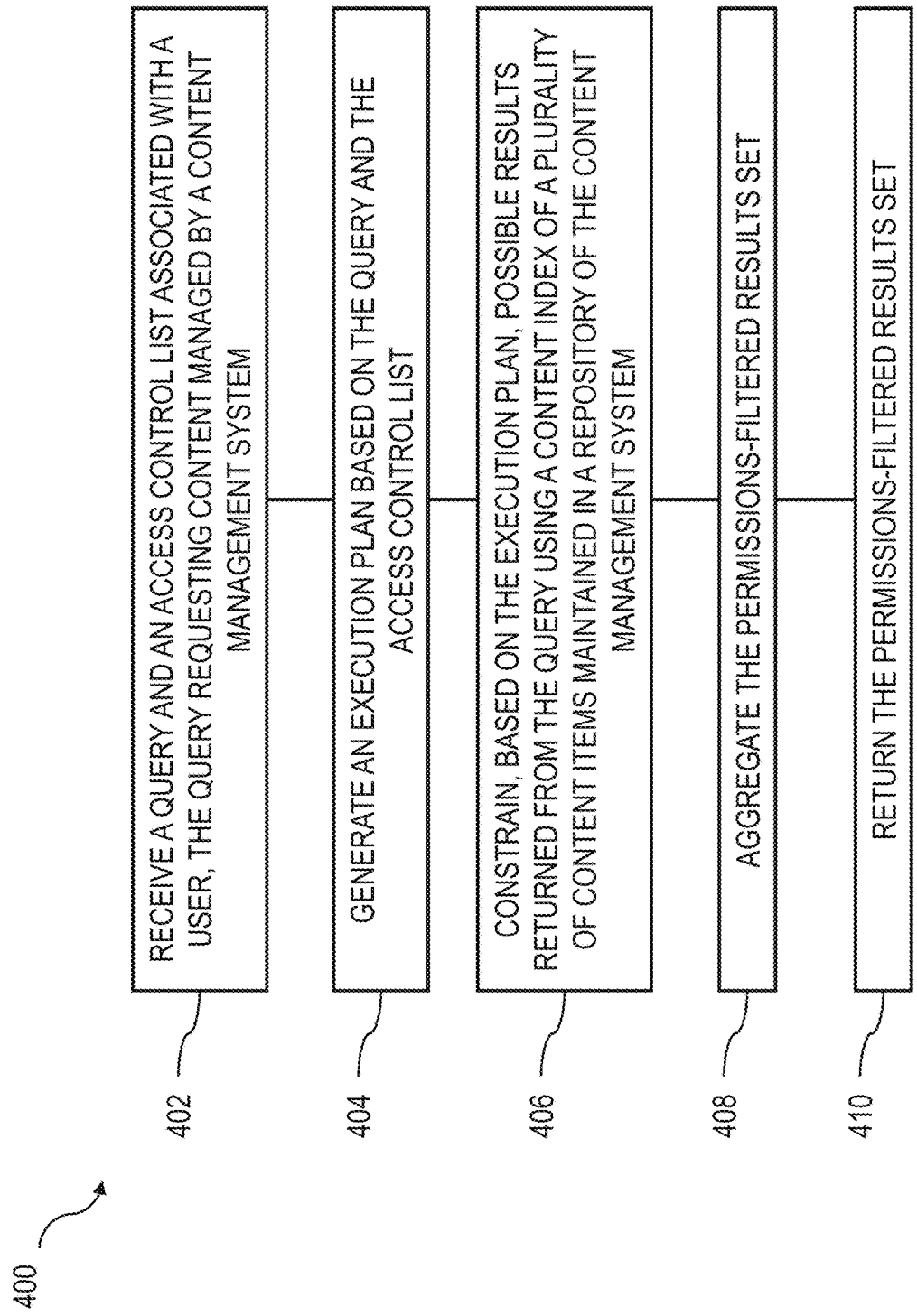
FIG. 4 shows a process flow diagram illustrating features that may be included in a method consistent with implementations of the current subject matter.

FIG. 4 shows a process flow diagram 400 illustrating features that can be included in a method consistent with implementations of the present description. The method can be executed by one or more processors and by one or more elements as described herein. For example, the method may be performed by the insight engine 350. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 402, the insight engine 350, for example, may receive a query and an access control list associated with a user. The query may request content managed by a content management system. The insight engine 350, at 404, may generate an execution plan based on the query and the access control list. At 406, the insight engine 350 may constrain, based on the execution plan, possible results returned from the query using a content index of a plurality of content items maintained in a repository of the content management system. The constraining may include limiting the insight engine 350 from adding a content item of the plurality of content items to a permissions-filtered results set based on the access control list identifying the user as not having permission to access the content item. At 408, the insight engine 350 may aggregate the permissions-filtered results set and at 410, may return the aggregated permissions-filtered results set. In some aspects, the returning includes providing the aggregated permissions-filtered results set to a user interface at the client 302.

Various implementations of the current subject matter can, among other possible benefits and advantages, provide single-sign-on functionality for a system that provides separate analytics and reporting of an CMS. The user can access an analytics engine (e.g., insight engine 350) to perform and retrieve analytical information about the CMS and access the content items managed and maintained by the ECM CMS in a seemingly single-sign-on system. The analytical queries processed by the insight engine 350 may preserve access control to the CMS 308 and may provide secure access to a set of documents in accordance with user permissions. In exemplary implementations, the insight engine 350 may be configured for real-time parsing a received query based on an applied ACL which reduce processing times for generating result sets in response to a query. The real-time processing performed by the insight engine 350 may avoid a time intensive and/or processing intensive ETL approach.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A computer-implemented method comprising:
receiving a query and an access control list associated with a user submitting the query for processing to a search engine, the access control list being assigned to the query for user authentication during query analysis by an insight engine, the query including a request to access content managed by a content management system;
generating an execution plan for the search engine to process the query, based on a virtual field included in a virtual database schema to specify different behaviors in generating the execution plan, the virtual field pointing to metadata stored in a database that is not assessable to the user submitting the query;
calculating the virtual field value based on one or more field values in the virtual database schema;
using the execution plan to search a search index and return a result set of documents, in response to receiving the query, wherein the virtual field does not exist in the search index;
constraining results returned from the query using a content index of a plurality of content items maintained in a repository of the content management system, the constraining comprising limiting a content item of the plurality of content items from being added to a permissions-filtered results set based on the access control list assigned to the query;
aggregating based on the execution plan, the permissions-filtered results set; and
returning the aggregated permissions-filtered results set to the content management system.

2. The method as in claim 1, further comprising:
evaluating user permissions based on a user identity of the user, the evaluating comprising searching a user permissions index for permissions granted to the user based on the user identity.

3. The method as in claim 2, wherein the user permissions index comprises an access control list index maintained by the content management system.

4. The method as in claim 3, wherein the evaluating of the user permissions comprises searching an access control list index for access control lists designating the user identity as having a sufficient level of access to content items assigned to the access control lists.

5. The method as in claim 1, wherein the query comprises a string of characters entered by the user into a user interface.

6. The method as in claim 5, wherein the returning the aggregated permissions-filtered results set comprises providing the aggregated permissions-filtered results set to the user interface.

7. The method as in claim 1, wherein the virtual field being configured to retrieve operational data including at least one of creations timestamps, deletion timestamps, lock timestamps, and time series data to eliminate need for users to specify complex SQL functions to specify time series queries that aggregate over datetime fields.

8. The method of claim 7, wherein the virtual field comprises time series data.

9. The method of claim 7, wherein the virtual field specifies a machine learning operation.

10. A system comprising:
at least one data processor; and
at least one memory storing instructions which, when executed by the at least one data processor, result in operations comprising:
receiving a query and an access control list associated with a user submitting the query for processing to a search engine, the access control list being assigned to the query for user authentication during query analysis by an insight engine, the query including a request to access content managed by a content management system;
generating an execution plan for the search engine to process the query based on a virtual field included in a virtual database schema to specify different behaviors in generating the execution plan, the virtual field pointing to metadata stored in a database that is not assessable to the user submitting the query;
calculating the virtual field value based on one or more field values in the virtual database schema;
using the execution plan to search a search index and return a result set of documents, in response to receiving the query, wherein the virtual field does not exist in the search index;
constraining results returned from the query using a content index of a plurality of content items maintained in a repository of the content management system, the constraining comprising limiting a content item of the plurality of content items from being added to a permissions-filtered results set based on the access control list assigned to the query;
aggregating based on the execution plan, the permissions-filtered results set and returning the aggregated permissions-filtered results set to the content management system.

11. The system as in claim 10, wherein the operations further comprise:
evaluating user permissions based on a user identity of the user, the evaluating comprising searching a user permissions index for permissions granted to the user based on the user identity.

12. The system as in claim 11, wherein the user permissions index comprises an access control list index maintained by the content management system.

13. The system as in claim 12, wherein the evaluating of the user permissions comprises searching an access control list index for access control lists designating the user identity as having a sufficient level of access to content items assigned to the access control lists.

14. The system as in claim 10, wherein the query comprises a string of characters entered by the user into a user interface.

15. The method as in claim 14, wherein the returning the aggregated permissions-filtered results set comprises providing the aggregated permissions-filtered results set to the user interface.

16. The method as in claim 10, wherein the generating is based on a virtual field.

17. The method of claim 16, wherein the virtual field comprises time series data.

18. The method of claim 16, wherein the virtual field specifies a machine learning operation.

19. A non-transitory computer program product storing instructions which, when executed by at least one data processor, causes operations comprising:
receiving a query and an access control list associated with a user submitting the query for processing to a search engine, the access control list being assigned to the query for user authentication during query analysis by an insight engine, the query including a request to access content managed by a content management system;
generating an execution plan for the search engine to process the query based on a virtual field included in a virtual database schema to specify different behaviors in generating the execution plan, the virtual field pointing to metadata stored in a database that is not assessable to the user submitting the query;
calculating the virtual field value based on one or more field values in the virtual database schema;
using the execution plan to search a search index and return a result set of documents, in response to receiving the query, wherein the virtual field does not exist in the search index;
constraining results returned from the query using a content index of a plurality of content items maintained in a repository of the content management system, the constraining comprising limiting a content item of the plurality of content items from being added to a permissions-filtered results set based on the access control list assigned to the query;
aggregating based on the execution plan, the permissions-filtered results set and returning the aggregated permissions-filtered results set to the content management system.

20. The non-transitory computer program product of claim 19,
wherein the user permissions index comprises an access control list index maintained by the content management system, and wherein the evaluating of the user permissions comprises searching an access control list index for access control lists designating the user identity as having a sufficient level of access to content items assigned to the access control lists.

* * * * *